April 27, 1954   B. E. BRADLEY   2,676,800
STOP DEVICE FOR WEB FEEDING MEANS
Filed Dec. 27, 1949   6 Sheets-Sheet 4

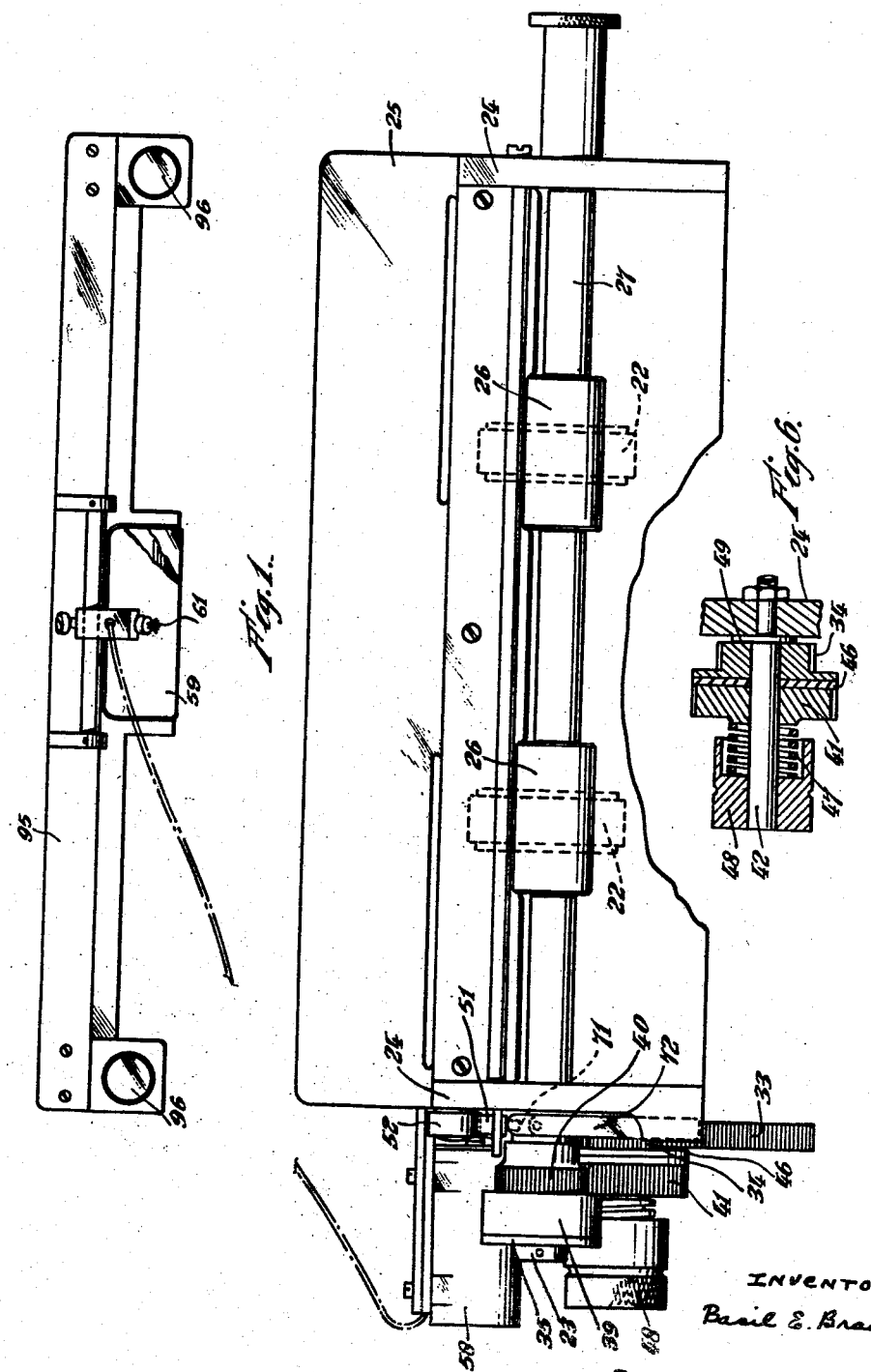

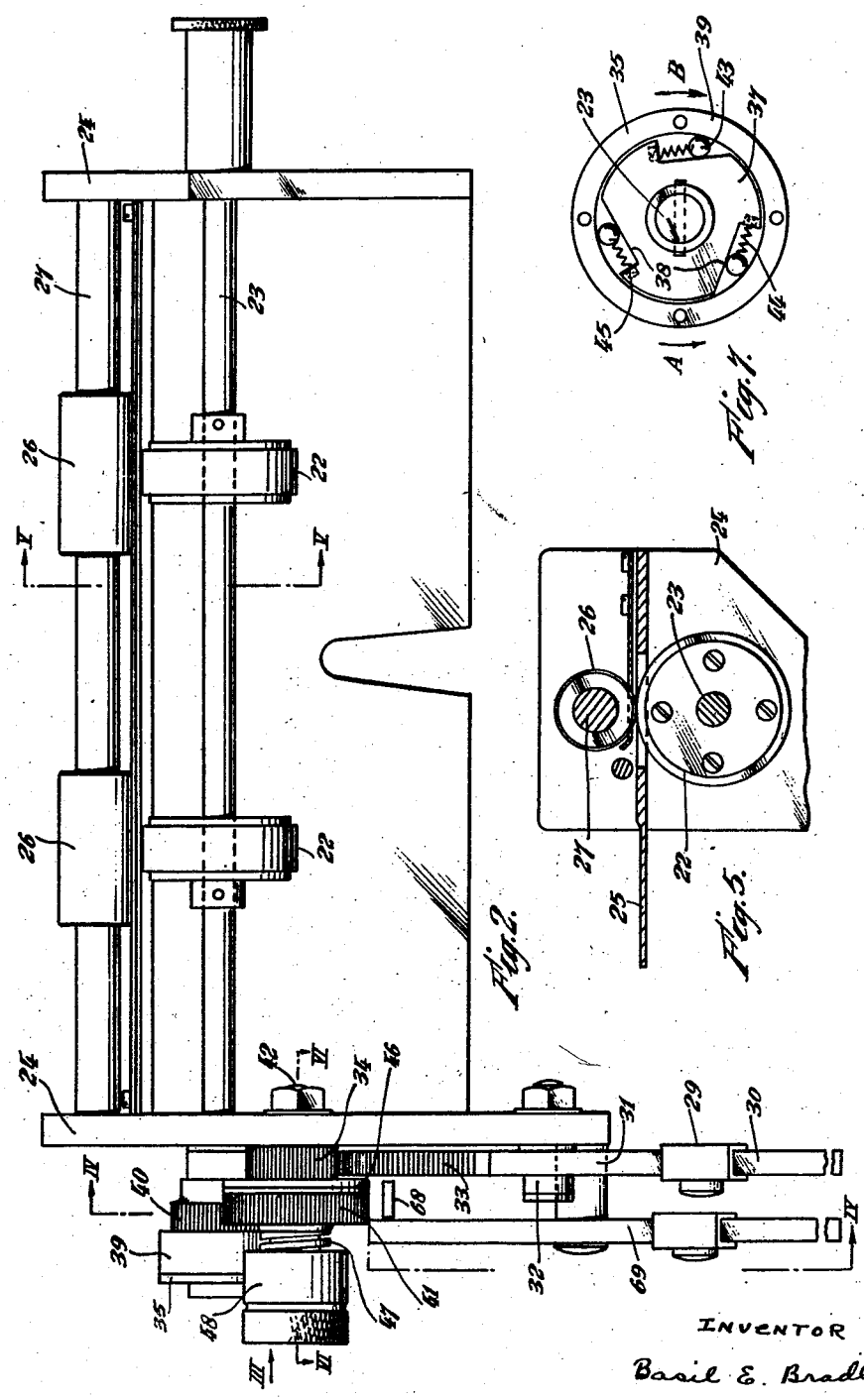

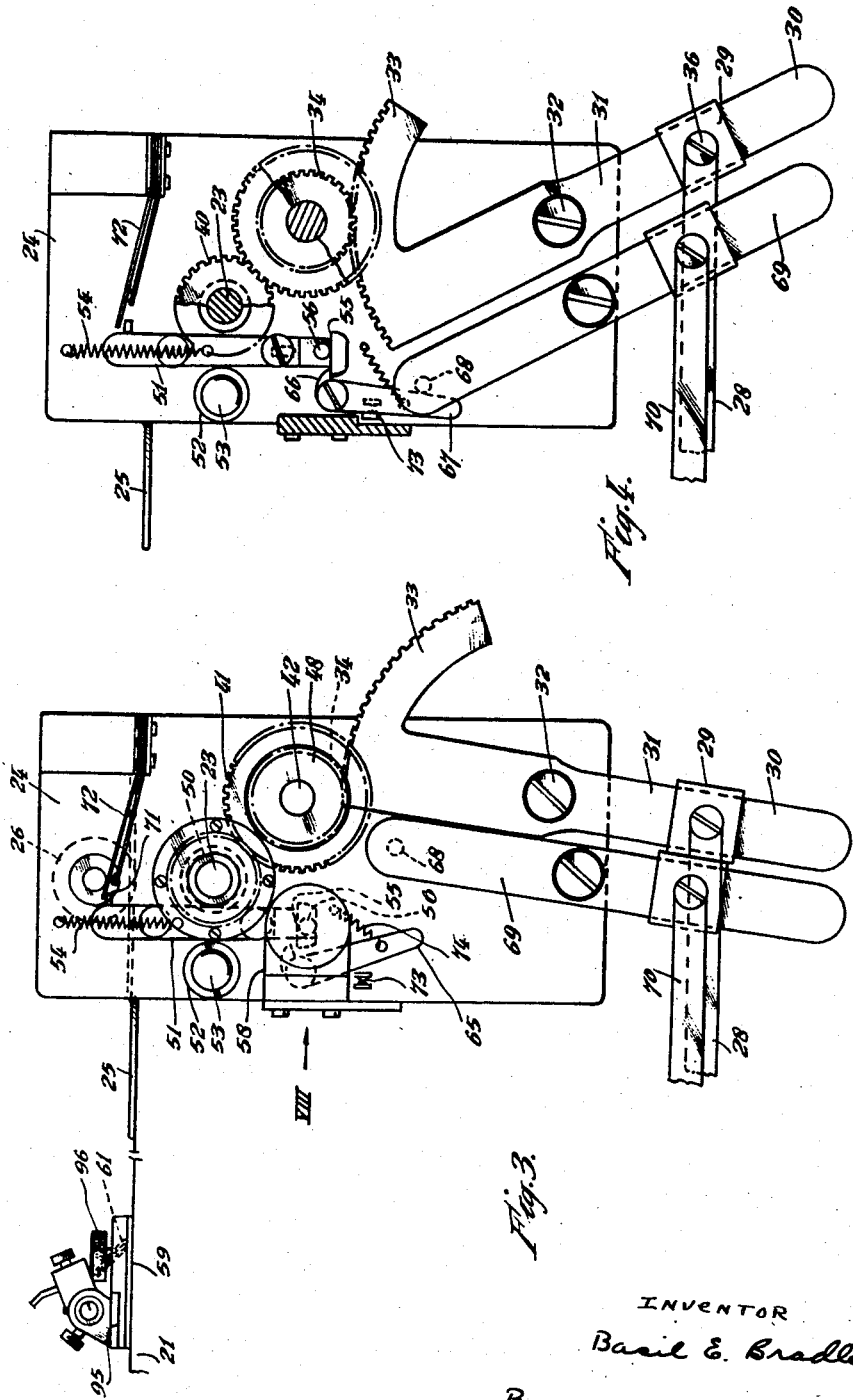

INVENTOR
Basil E. Bradley
By Watson, Cole, Grindle & Watson

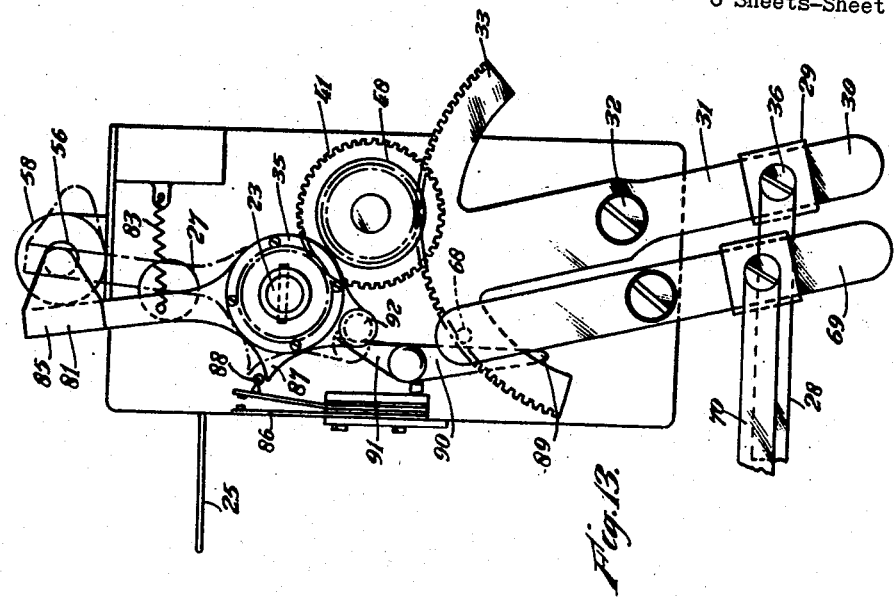
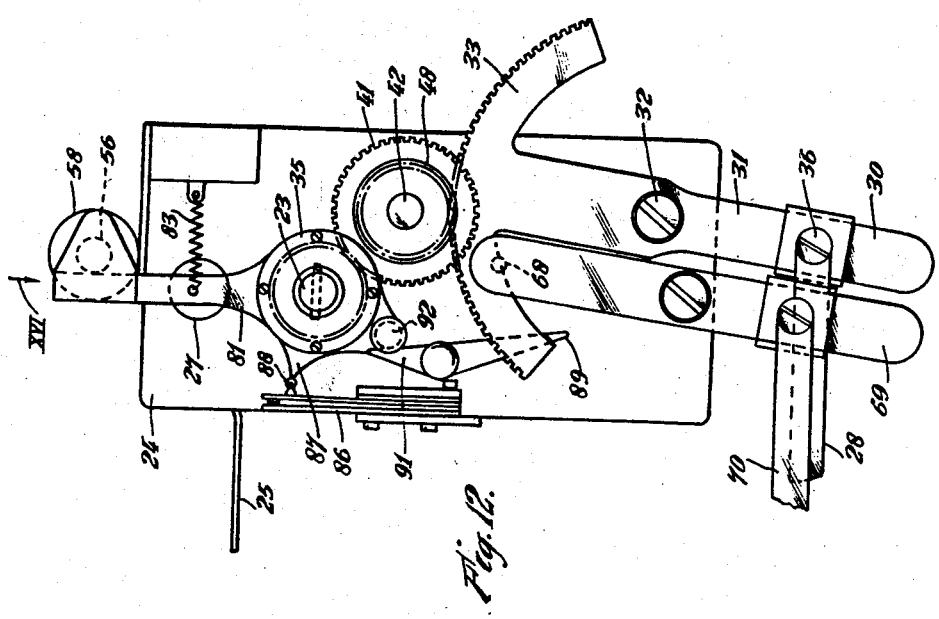

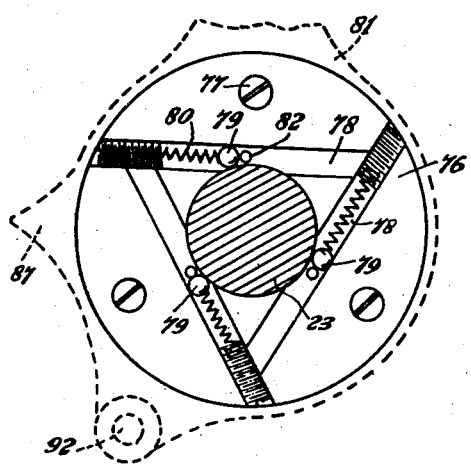
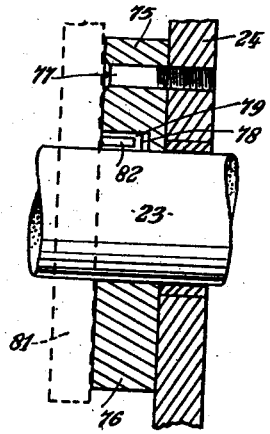
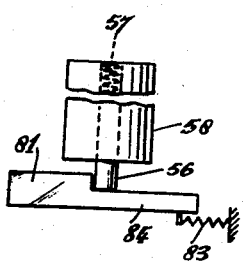
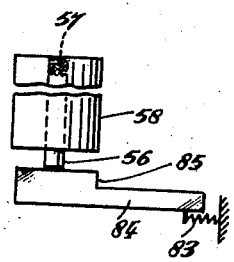
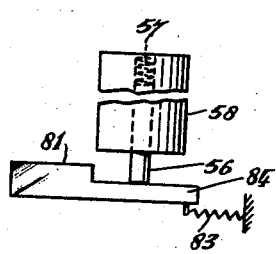

Patented Apr. 27, 1954

2,676,800

UNITED STATES PATENT OFFICE 2,676,800

STOP DEVICE FOR WEB FEEDING MEANS

Basil Edward Bradley, Surbiton, England, assignor, by mesne assignments, to Egry Limited, Acton, England, a corporation of Great Britain and Northern Ireland Application December 27, 1949, Serial No. 135,083

Claims priority, application Great Britain January 4, 1949

8 Claims. (Cl. 271—2.6)

This invention relates to stop devices and particularly to stop devices for limiting the movement of a continuous web through a machine wherein the movement of said web is effected by a rotary or roll feed device, that is, by causing a roller to rotate and also causing said web to pass around said roller and thereby be fed or drawn through a station.

In many forms of machines of the type described, for example, in addressing or other printing machines through which a continuous web of paper or other material, hereinafter referred to as paper, passes to be printed, the web being drawn intermittently through the printing station so that it may remain stationary in said printing station whilst the printing is being effected, the driving mechanism continues to operate whilst the web is stationary, means being provided to enable this to be effected. Usually, an oscillating or reciprocating member and a uni-directional drive device are disposed in the drive transmission between the driving mechanism and the web feed roller, so that at predetermined intervals the drive to the said feed roller is interrupted. The length of feed of the web between stops at the printing station, is determined by the length of the oscillating or reciprocating movement of the relevant member, and such length of feed may be adjusted, to suit different lengths of feed which may be required for different lengths of forms comprised in the continuous web, by varying the length of the travel of the oscillating or reciprocating member.

If the web is partially pre-printed, so as to form continuous stationery which is to be further printed, it may happen, through errors in the spacing of the pre-printed forms or other portions on the web, through creep of the web relative to the said moving part, or for other reasons, the said pre-printed forms or other portions of the web may gradually move more out of correct registration with the printing station, with the result that the further printing is applied to the form or the like in an incorrect position. In order that the form or the like on the web may be brought into correct registration with the printing station it is necessary for the movement of the oscillating or reciprocating member to be adjusted repeatedly; such adjustment necessitates stopping the machine and thereby causes loss of production.

The object of the present invention is to provide an automatically adjustable stop device which will ensure that the web is stopped in correct registration with the printing station.

According to this invention, in apparatus of the type described, a stop device comprises means for locking the web feed roller against rotation, and a friction clutch device disposed in the drive transmission to said feed roller whereby slip may be allowed between members when said locking operation is effected, the said locking means being normally urged into said locking position and being adapted to be retained in the unlocking position by a bolt or the like, the said bolt or the like being electro-magnetically operated to release said locking means, an electro-magnetic device being energised when a predetermined part of a form on the web arrives at a fixed position on the machine.

In the accompanying drawings:

Fig. 1 is a plan view of one form of device according to the invention,

Fig. 2 is a front elevation,

Fig. 3 is an end elevation, looking in the direction of arrow III, Fig. 2,

Fig. 4 is a part sectional end elevation, on line IV—IV of Fig. 2,

Fig. 5 is a fragmentary transverse sectional elevation, on line V—V of Fig. 2,

Fig. 6 is a sectional plan view of a detail, on line VI—VI of Fig. 2,

Fig. 7 is an end elevation of a uni-directional device, with a cover removed,

Figs. 12 and 13 are end views, in direction of arrow XII, Fig. 1,

Figs. 14 and 15 are enlarged transverse and longitudinal sections, respectively, of a detail, and Figs. 16, 17 and 18 are diagrammatic plan views, in direction of arrow XVI, Fig. 12, showing various relative positions of details.

Figure 11:
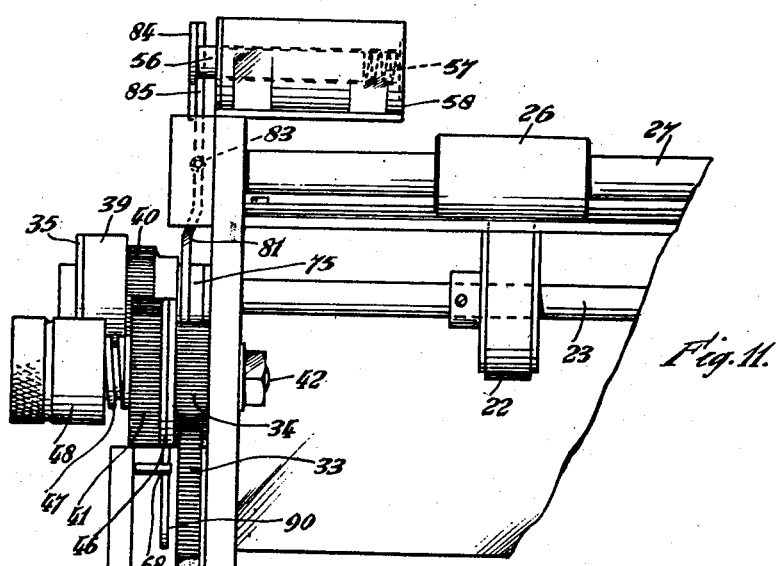
Fig. 11 is a front elevation of a modified embodiment of the invention.
Figure 8:
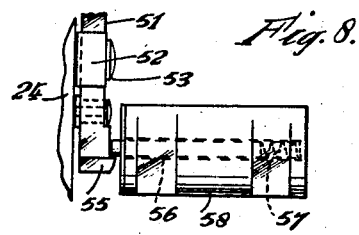
Fig. 8 is a rear elevation of a detail, looking in direction of arrow VIII, Fig. 3.

The forms of the invention illustrated are adapted to an addressing or like machine through which continuous stationery is intermittently fed whereby an address or other pre-set information may be printed by means of an embossed plate and a ribbon, the ribbon being interposed between the said plate and the paper, and the paper being pressed on to the ribbon and the plate by a printing pad, carried by a movable printing arm, the continuous web being drawn through the printing station which is located in a suitable position on a table 21, by rollers 22 secured to a spindle 23, which is rotatably mounted in frame members 24 which are rigidly secured to the table 21 in any suitable manner and located thereon by a horizontally projecting lip 25 on the frame, the web passing between said rollers 22 and other rollers 26 freely rotatable on a spindle 27 also mounted in the frame members 24. The spindle 23 and rollers 22 are adapted to be rotated intermittently in one direction only by means hereinafter described. The drive to the spindle 23 is through a continuously rotating wheel, crank or like member (not shown) on which is an eccentrically mounted pin or crank pin (also not shown), one end of a connecting rod 28 being connected to said pin and the other end of the connecting rod being connected at 29 to one arm 30 of a rocking lever 31 which is pivotally mounted at 32 on one of the frame members 24. A toothed quadrant rack 33 is formed on the other end of the rocking lever 31 and is in mesh with a toothed gear wheel 34 through which and other interconnected gearing to be described a drive is transmitted to the said web feed rollers 22. A uni-directional drive device 35 is disposed in the drive transmission between the toothed gear wheel 34 and the feed roller spindle 23 whereby the feed rollers 22 are rotated only when the rocking lever 31 moves in one arcuate direction (clockwise, Figs. 3 and 4), the feed rollers remaining stationary when the rocking lever moves in the opposite arcuate direction. The connection 29 of the connecting rod 28 to the rocking lever 31 comprises a sleeve which may be adjusted along the arm 30 whereby to vary the distance between the connection 29 and the pivot 32 and thereby vary the arc through which the lever 31 oscillates and so vary the length of feed of the web whilst the feed rolls 22 are rotating; this adjustment is made at the beginning of a printing operation, to suit the length of the forms on the paper web and is retained throughout said operation, the sleeve 29 being locked to the arm 30 by a stud 36.

The uni-directional drive device 35 preferably is a device wherein the pitch or stroke thereof is infinitely and automatically variable. For example (as shown in Figs. 1 to 4 and Fig. 7), it may comprise a rotary member 37 rigidly mounted on the spindle 23 of the feed rollers so as to rotate with said rollers. The member 37 is provided on its periphery with a series of, for example, three, wedge or ramp surfaces 38, and is rotatably disposed within a rotary sleeve 39 which is mounted, freely rotatable except as hereinafter described, on the spindle 23. The sleeve 39 is provided externally with a toothed gear 40 which is in mesh with a toothed gear 41 freely mounted on a spindle 42. The toothed gear 41 is mounted for rotation, except as hereinafter described, with the toothed gear 34 which also is freely mounted on the spindle 42. Rollers 43, Fig. 7, are disposed between the inner surface of the sleeve 39 and each wedge or ramp surface 38 on the member 37 so that as the sleeve 39 is rotated in one direction (arrow B, Fig. 7) the rollers 43 are wedged between the sleeve and the rotary member 37 whereby a drive is transmitted to the rotary member and to the feed rolls 22, and when the sleeve is rotated in the opposite direction (arrow A) the sleeve will rotate freely relative to the rotary member. Helical compression springs 44 abut the rollers 43 and abutments 45 on the rotary member 37 to urge the rollers into the wedging position.

The spindle 42 is rigidly mounted on one of the frame members 24, Fig. 6, and the toothed gears 34 and 41 are freely rotatable thereon. A friction disc 46 is disposed between the gears 34 and 41, and the said gears and the disc are pressed axially into facial engagement with each other by a helical compression spring 47 and a cap 48 screwed onto the spindle 42; the axial pressure between the gears and the disc may be adjusted by rotating the cap 48 on the spindle. Suitable thrust washers 49 are mounted on the spindle 42. The assembly constitutes a friction face clutch whereby, normally, a rotary drive is transmitted to the feed rolls 22 during the driving movement of the rocking lever 31, but so that when means (to be described) are provided, during said driving movement, to lock the feed rolls against rotation, the clutch members 34, 46 and 41 may slip relatively to each other and so allow the rocking lever to continue its driving movement.

A roller 50 is rigidly mounted on the feed roll spindle 23 and a wedge 51 is disposed between the roller 50 and a fixed abutment on the machine so that when the wedge is drawn or pushed between the roller 50 and the abutment the spindle 23 may be locked against rotation. The fixed abutment may be a roller 52 freely rotatably mounted on a pin 53 fixed to the machine frame 24. The wedge 51 is urged by a spring 54 into the locking position.

When the wedge 51 is withdrawn from between the roller 50 and the abutment 52, in the manner hereinafter described, a shoulder or ledge 55 thereon is engaged by a bolt 56, which is urged by spring 57 into said engagement, whereby the wedge is retained in said withdrawn or unlocking position. The bolt 56 is provided by the axially movable bar or core of a solenoid 58 whereby, when said solenoid is energised the bolt is withdrawn, against the action of the spring 57, out of engagement with the ledge 55 on the wedge 51 and the wedge is drawn by its spring 54 into position locking the feed rolls 22 against rotation.

Figure 10:
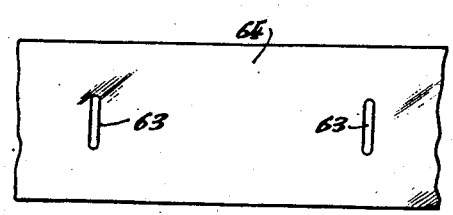
Fig. 10 shows diagrammatically, a portion of a web of continuous stationery.
Figure 9:
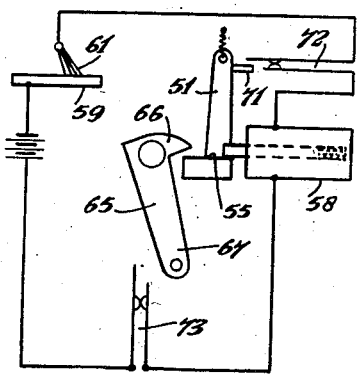
Fig. 9 is a wiring diagram.

The solenoid 58 is in an electric circuit adapted to be closed when a portion of the continuous stationery arrives in correct registration with the printing station. For example, at an appropriate position in relation to the printing station, a contact plate 59 (Figs. 1, 3 and 9) is provided on the printing table 21 and one lead in the circuit of the solenoid is connected to said plate. A contact brush 61 is disposed above the plate 59 and is depressed by a spring or otherwise to make contact with the plate; the contact brush is connected to another lead of the solenoid circuit, and thereby the circuit is completed. The plate 59 and brush 61 are mounted on a frame 65, and insulated therefrom and from each other, which frame is attached to the printing table 21 in suitable manner, for example, by screws 96. The continuous stationery passes between the plate 59 and brush 61, and normally retains said members out of contact with each other and thereby breaks the solenoid circuit. A slotted or other perforation 63, Fig. 10, is provided in each portion or form of the web 64 of continuous stationery, at a predetermined position therein in relation to the preprinted matter on the form so that when the form is in the correct printing position the perforation will register with the contact plate 59 and brush 61 and thereby allow the brush to make contact with the plate through the perforation and complete the solenoid circuit.

In operation, as the feed rolls 22 are rotated and draw the paper web through the printing station, a perforation 63 will register with the contacts 59, 61 in the manner described and the solenoid 58 will be energised, thereby causing the bolt 56 to be withdrawn from the ledge 55 on the wedge 51 and the wedge to lock the feed roll spindle 23 against rotation. The slipping clutch 34, 41, 46 will allow the rocking lever 31 to complete its driving movement whilst the feed rolls 22 remain stationary. Consequently, each time a perforation 63 registers with the contacts 59, 61, and the form on the web is in correct registration with the printing station, the feed rolls 22 will be locked and further movement of the web will be restrained, a form thereby being retained in the printing station to enable the printing to be effected. No matter how much the web may creep during feeding or how imperfectly positioned the pre-printed matter on the form may be the form will always be stopped with the form in correct registration with the printing station.

During the non-driving movement of the rocking lever 31 the wedge 51 is withdrawn from the position locking the feed roll spindle 23 whereby the feed rolls 22 may again be rotated when the rocking lever commences its driving movement. A bell-crank lever 65 is pivotally mounted on the machine frame, having a short arm 66 disposed above the ledge 55 on the wedge, and a long arm 67 depending into the path of a pin 68 projecting from a second rocking lever 69 which moves substantially synchronously with the rocking lever 31, the lever being driven by a connecting rod 70 from some part of the printing mechanism. As the rocking lever 69 returns during the non-driving movement of the rocking arm lever 31 the long arm 67 of the bell-crank lever 65 is moved whereby the short arm 66 depresses the wedge 51 to withdraw it out of the locking position. Previously, after the wedge 51 has been released by the solenoid bolt 56 and has reached or almost reached its locking position, a pin 71 on the wedge abuts (Fig. 3) one member of a second pair 72 of contact members disposed in the solenoid circuit, which contact members are normally spring-urged into contact with each other, and causes said contact members to break contact and so break the solenoid circuit. The solenoid bolt 56 is thereby again allowed to be spring pressed towards the wedge, and it abuts the face of the wedge below the ledge 55 until such time as the wedge is depressed out of the locking position, whereupon the bolt again engages the ledge 55 to retain the wedge in the unlocking position. It is essential that this breaking of the solenoid circuit be effected as soon as possible after the wedge has been allowed to move into the locking position, so that the solenoid may not be overheated by reason of the circuit being retained should the machine stop with the wedge in the locking position.

A third pair 73 of contact members, normally spring retained in contact with each other, are disposed in the solenoid circuit and are adapted for one of them to be engaged by the long arm 67 of the bell-crank lever 65, when said lever is making the movement to depress the wedge 51 so that the solenoid circuit is broken at said contact members; this ensures that when the wedge is withdrawn from the locking position, and the second pair 72 of contact members associated therewith again make contact with each other, the solenoid circuit is broken before the solenoid bolt 56 re-engages the ledge 55 on the wedge and before the rocking lever 31 again commences a driving movement. After the rocking lever 31 has commenced its driving movement, and the paper web again moves through the printing station, the third pair 73 of contact members are again allowed, by the levers 69 and 65 moving therefrom, to make contact with each other, the lever 65 being returned by a spring 74 to its normal position, and the solenoid circuit is again in a condition to be completed when the contact plate 59 and brush 61, now again having the paper web interposed therebetween, make contact with each other through the next perforation in the web.

In the modified form of the invention, shown in Figs. 11 to 18, the feed rolls 22 are driven substantially in the manner described, that is, a uni-directional drive device 35 is mounted on the feed roll spindle 23 and is driven by a toothed gear wheel 41. A second toothed gear wheel 34 is angularly reciprocated by a toothed quadrant 33 in mesh therewith and mounted on a rocking lever 31 provided with means for adjusting the arc of movement of the quadrant. A uni-directional device 35 is mounted on the spindle 23. A face clutch disc 46 is disposed between the toothed gear wheels 41, 34, which are freely mounted on a common spindle 42, whereby normally, a rotary drive is transmitted to the feed rolls during the driving movement of the rocking lever 31, but so that when means are provided, during the said movement, to lock the feed rolls against rotation, the face clutch will allow the two toothed gear wheels 41, 34 to rotate relatively to each other and so allow the rocking lever to continue its driving movement.

A clutch device 75 (Figs. 14 and 15) is mounted on the feed roll spindle 23 and comprises a sleeve 76 concentric with and disposed around said spindle, the sleeve being secured against rotation, for example, by being secured by studs 77 to the frame 24 of the machine. One or more housings are formed within the sleeve; for example, there may be three said housing formed by channels 78 angularly disposed around the spindle 23. The spindle projects into the channels so as to reduce their width. Each channel accommodates a roller 79, disposed with its axis parallel to the spindle 23 and freely located so that it may roll around and in contact with the periphery of the spindle, and a helical compression spring 80 is also disposed within each channel and is adapted to urge the roller 79 around the spindle 23 in the direction of rotation of the spindle and so as to wedge it between the spindle and the opposite wall of the channel.

A lever 81, hereinafter referred to as the clutch lever, is rotatably mounted on the feed roll spindle 23 and is provided on its rear face with three angularly spaced pins 82 each of which is adapted to project into the front axial end of the sleeve 76 and into a housing channel 78 (Fig. 15) so as to be disposed on that side of the roller 79 in the direction of rotation of the spindle 23 (clockwise in Figs. 12, 13 and 14), the arrangement being such that when the lever 81 is moved angularly on the spindle 23 in the direction opposed to the direction of rotation of the spindle (anti-clockwise Figs. 12, 13 and 14) the pins 82 will press the rollers 79 in said opposed direction against the action of the compression springs 80, whereby the spindle 23 may rotate within and relatively to the sleeve 76, and when the lever 81 is moved in the same angular direction as the spindle 23 the rollers 79 are allowed to be pressed, by the springs 80, to make frictional wedging contact with the surface of the spindle and the opposed walls of the channels 78 whereby the spindle is locked against rotation within the sleeve. The clutch lever 81 normally is urged by a tension spring 83, suitably anchored, to move angularly in the direction of rotation of the feed roll spindle 23.

The clutch lever 81 is provided on its upper end with a face 84 (Figs. 16, 17 and 18) disposed in a plane substantially normal to the axis of the lever, and said face is disposed across the end of an axially movable bolt 56 which forms the core of a solenoid 58. The bolt is adapted normally to be pressed axially by a spring 57 in the solenoid against the face 84 of the lever and to be withdrawn from said face when the solenoid is energised. A step 85 is formed on the face 84 of the clutch lever and is adapted to form a stop to abut the side of the solenoid core 56 (Fig. 16) whereby the clutch lever is prevented by the core from being moved further angularly by the spring 83; when the core is withdrawn, on the solenoid being energised, the stop 85 on the clutch lever face 84 is allowed to move past the core end (Fig. 17) under the urging of the spring 83. The face 84 of the lever, including the outer face of the step 85, is sufficiently large so that during the whole angular movement of the lever the said face never uncovers the end of the core 56; thereby, no matter what angular position the lever is in, the core end will always abut the face of the lever or of the step when the solenoid is de-energised and the core is spring-urged to its normal projected position.

The solenoid 58 is in an electric circuit adapted to be closed when a portion of the continuous stationery arrives in correct registration with the printing station, in the manner hereinbefore described.

A switching device 86 is disposed in the solenoid circuit and comprises two contact arms carrying contact points adapted normally to be spring pressed apart so as to break the solenoid circuit. One of said contact arms is adapted to be pressed into contact with the other arm by a cam finger 87 on the clutch lever 81 when the clutch lever is in the position with the stop 85 thereon abutting the side of the solenoid core 56 to prevent the further rotary movement of the lever. When the stationery moves into position on the printing table with a perforation therein exposing the contact plate to the contact brush, the solenoid is energised, the core is withdrawn from stopping contact with the stop 85, and the clutch lever 81 is moved angularly by its spring 83 further in the direction of rotation of the feed roll spindle 23. When the lever so moves, the cam finger 87 moves out of contact with the contact arm of the switching device 86, which contact may be effected through the medium of an insulated roller 88 on said contact arm, so as to allow the contact arms to move apart and so break the solenoid circuit.

When the clutch lever 81 is moved by its spring in the manner described, that is, in the direction of rotation of the feed roll spindle, the pins 82 on the lever arm are moved away from the rollers 79 in the clutch device 75, so allowing the rollers to be spring pressed into frictional locking engagement with the periphery of the feed roll spindle and the opposite walls of the channels 78 thereby locking the feed roll spindle 23 against further rotation. The face clutch disc 46 will allow the two coaxial toothed gear wheels 34 and 41 to slip relatively to each other and the rocking lever 31 will be allowed to complete its driving movement whilst the feed rolls 22 remain stationary. Consequently, each time a perforation registers with the contact plate and brush, and the form on the web is in correct registration with the printing station, the feed rolls 22 will be locked and further movement of the web will be restrained, a form thereby being retained in the printing station to enable the printing to be effected.

During the non-driving movement of the rocking lever 31 a pin 68 on a second rocking lever 69 abuts one arm 89 of a trip lever 90 and actuates said lever for the other arm 91 thereof to abut a finger 92 on the clutch lever 81 whereby the clutch lever is counter-rotated, that is, moved angularly in the opposite direction to the rotation of the feed roll spindle 23, so that the pins 82 on the clutch lever again make contact with the rollers 79 and move them, against their springs 80, out of frictional locking contact with the periphery of the feed roll spindle 23 and the walls of the channels 78; the feed roll spindle is then again in condition to be rotated when the rocking lever 31 makes its next driving movement. At the same time the step 85 on the face 84 of the clutch lever 81 is moved back (Fig. 18) so as to allow the solenoid bolt 56 to move forward axially to provide a stop against the next return or forward movement of the clutch lever; also the finger 87 on the clutch lever again momentarily closes the contact arms of the switching device 86 as it moves into contact with the roller 88 thereon, the contact arms then again moving apart as the finger travels past said roller.

When the rocking lever 31 commences its driving movement it immediately causes the feed roll spindle 23 to be rotated whereby the continuous stationery is fed through the machine and the contact brush and plate are separated from each other by the paper. Then, the rocking lever 69 moves simultaneously with the lever 31, the trip lever 90 is released and the clutch lever 81 is moved by its spring 83 for the step 85 on the clutch face 84 to abut the end of the solenoid bolt 56, thereby stopping further rotation of the clutch lever, in which position the finger 87 on the clutch lever again operates to close the contact arms of the switching device 86. The cycle of operations described is then repeated.

What I claim and desire to secure by Letters Patent is:

1. A web feeding and registering device for intermittently advancing the web and comprising a rotary feed mechanism including a rotary spindle, intermittent, uni-directional drive means for said spindle, a friction clutch device operatively connecting said drive means and said spindle, means for locking said spindle at predetermined positions of said web, an electromagnetic device for causing said locking means to lock said spindle, and an electric circuit for said electromagnetic device, said electric circuit including a pair of contacts between which the continuous web passes and which make contact with each other when an aperture in the web registers therewith thereby to complete the electric circuit and cause the electromagnetic device to be operated, characterized in that means are provided to break said circuit, firstly, by the movement of the locking means to arrest movement of the web, and secondly, by the movement of the locking means to free the web and allow movement thereof, and to retain the said second break of the circuit until the circuit is broken by the interposition of the web between said pair of contacts.

2. A device according to claim 1, wherein said circuit-breaking means comprises normally closed contacts disposed in the said electric circuit, and means associated with said locking means for causing said contacts to open when said locking means moves into position to arrest movement of the web and during movement of said locking means from the locked position to the free position, thereby to break the circuit.

3. A web feeding and registering device for intermittently advancing the web and comprising a rotary feed mechanism including a rotary spindle, intermittent, uni-directional drive means for said spindle, a friction clutch device operatively connecting said drive means and said spindle, means for locking said spindle at predetermined positions of said web, an electromagnetic device for causing said locking means to lock said spindle, and an electric circuit for said electromagnetic device, said electric circuit including a pair of contacts between which the continuous web passes and which make contact with each other when an aperture in the web registers therewith thereby to complete the electric circuit and cause the electromagnetic device to be operated, characterized in that means are provided to break said circuit, firstly, by the movement of the locking means to arrest movement of the web, and secondly, by the movement of the locking means to free the web and allow movement thereof, and to retain the said second break of the circuit until the circuit is broken by the interposition of the web between said pair of contacts, and further characterized in that said locking means comprises a fixed member, a wedging member, means normally urging said wedging member into locking engagement between said fixed member and said spindle, means for moving said wedging member out of said locking engagement, and means releasable by said electro-magnetic device for holding said wedging member out of said locking engagement.

4. A device according to claim 3, wherein the means for moving the wedging member from the locking position comprises a lever positioned to actuate said wedging member and a reciprocal member operable by said drive means to engage and actuate said lever during the non-driving part of the cycle of said drive means.

5. A device, according to claim 3, wherein said wedging member comprises a tapered wedge.

6. A device, according to claim 5, wherein the wedge is provided with a ledge adapted to be engaged by said holding means to retain said wedge out of the locking position.

7. A device, according to claim 6, wherein the wedge is provided with a projection for engagement by the means for withdrawing the locking means from the locking position.

8. A device according to claim 3, wherein said fixed member is associated with a peripheral portion of said spindle to provide a constricted space, said wedging member comprises a roller disposed in said constricted space, said urging means comprises a spring mounted to urge the roller along said space into wedging engagement with said fixed member and said spindle, and said moving means comprises a lever rotatably mounted on said spindle, a pin on said lever and projected into the path of said roller and adapted when the said lever is moved angularly in the direction opposed to the direction of rotation of the spindle to abut said roller whereby to move it against the spring out of said wedging engagement and to allow said roller to be spring urged into said wedging engagement when the lever is moved angularly in the same direction as the spindle, spring means adapted to urge said lever to move angularly in the same direction as the spindle, and a step on said lever adapted to be engaged by said holding means whereby to restrain angular movement of the lever under the urge of said spring means.

References Cited in the file of this patent

UNITED STATES PATENTS

| Number | Name | Date |
|---|---|---|
| 582,311 | Parnaland | May 11, 1897 |
| 1,503,777 | Wilcox | Aug. 5, 1924 |
| 1,608,893 | Loewy | Nov. 30, 1926 |
| 1,974,207 | Ellinger | Sept. 18, 1934 |
| 1,988,486 | Ferenci | Jan. 22, 1935 |
| 2,199,708 | Maxfield | May 7, 1940 |
| 2,368,001 | Cooper | Jan. 23, 1945 |
| 2,464,561 | Dickinson | Mar. 15, 1949 |

FOREIGN PATENTS

| Number | Country | Date |
|---|---|---|
| 541,979 | Germany | Jan. 21, 1932 |